(12) United States Patent
Tashiro (10) Patent No.: US 6,286,982 B1
(45) Date of Patent: Sep. 11, 2001

(54) LIGHTING APPARATUS FOR A BICYCLE

(76) Inventor: Isao Tashiro, 404, 5-29, Narashinodai 3-chome, Funabashi-shi, Chiba-ken (JP)

( * ) Notice: Subject to any disclaimer, the term of this patent is extended or adjusted under 35 U.S.C. 154(b) by 0 days.

(21) Appl. No.: 09/524,689

(22) Filed: Mar. 14, 2000

(30) Foreign Application Priority Data

Mar. 16, 1999 (JP) .................................................. 11-070052

(51) Int. Cl.$^7$ .................................................. F21V 33/00
(52) U.S. Cl. .......................... 362/474; 362/473; 362/191
(58) Field of Search .................................. 362/205, 473, 362/474, 475, 476, 190, 191, 208; 340/432

(56) References Cited

U.S. PATENT DOCUMENTS

| | | | |
|---|---|---|---|
| 1,439,430 | * 12/1922 | Lyhne | 362/473 |
| 5,276,593 | * 1/1994 | Lighthill et al. | 362/473 |
| 5,833,534 | * 11/1998 | Lai | 362/473 |

* cited by examiner

Primary Examiner—Y. Quach
(74) Attorney, Agent, or Firm—Armstrong, Westerman, Hattori, McLeland & Naughton, LLP (57) ABSTRACT

A lighting apparatus having a light emitting unit separable from a battery case can be used conveniently for a bicycle. The light emitting unit incorporates a light bulb capable of being lighted on with an electric current supplied from the battery case through a power supply cable. Since the light emitting unit is separated from the battery case, it can be made compact and easily mounted on the handlebar of the bicycle independent of the battery case. Consequently, the light emitting unit is not a hindrance to a bicycle rider in handling the bicycle, and it is hard to experience a shock and be damaged in riding the bicycle. By demounting the light emitting unit and battery case from the bicycle and uniting them directly to each other, the lighting apparatus can be used as a portable flashlight.

2 Claims, 7 Drawing Sheets

LIGHTING APPARATUS FOR A BICYCLE

BACKGROUND OF THE INVENTION

1. Field of the Invention

This invention relates to a lighting apparatus used for a bicycle, and more particularly to a convenient lighting apparatus easy to handle, which has a light emitting unit separable from a battery case so as to easily mount the light emitting unit on a bicycle independent of the battery case.

2. Description of the Prior Art

A flashlight using batteries has been often used conveniently for a bicycle in place of a dynamo generator that requires surplus pedaling force for rotating the dynamo generator to generate electricity.

In general, the conventional flashlight type bicycle light or headlight has one or more batteries and a light bulb incorporated in one housing and is usually mounted on a handlebar or other portion of the bicycle together with the batteries.

Figure 1:
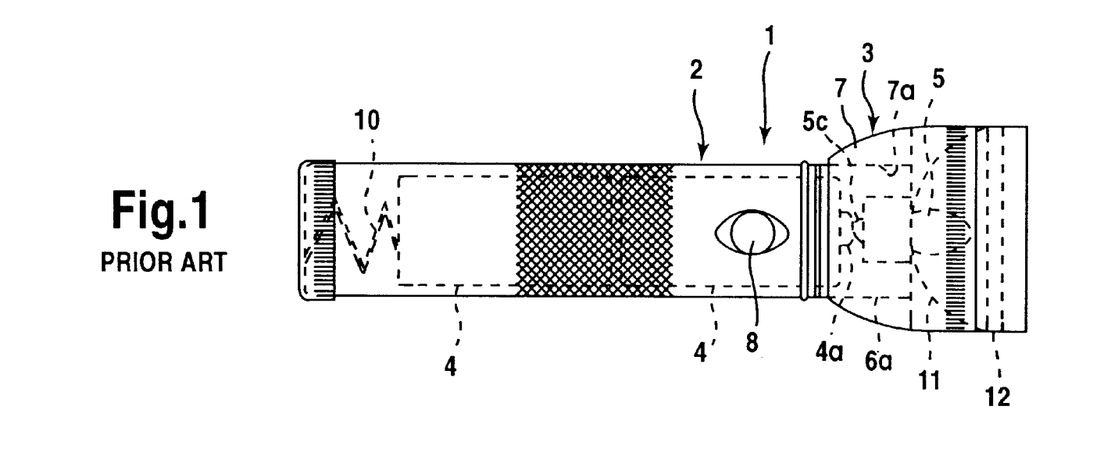
FIG. 1 is a side view showing a prior art flashlight applicable to a bicycle.
Figure 2:
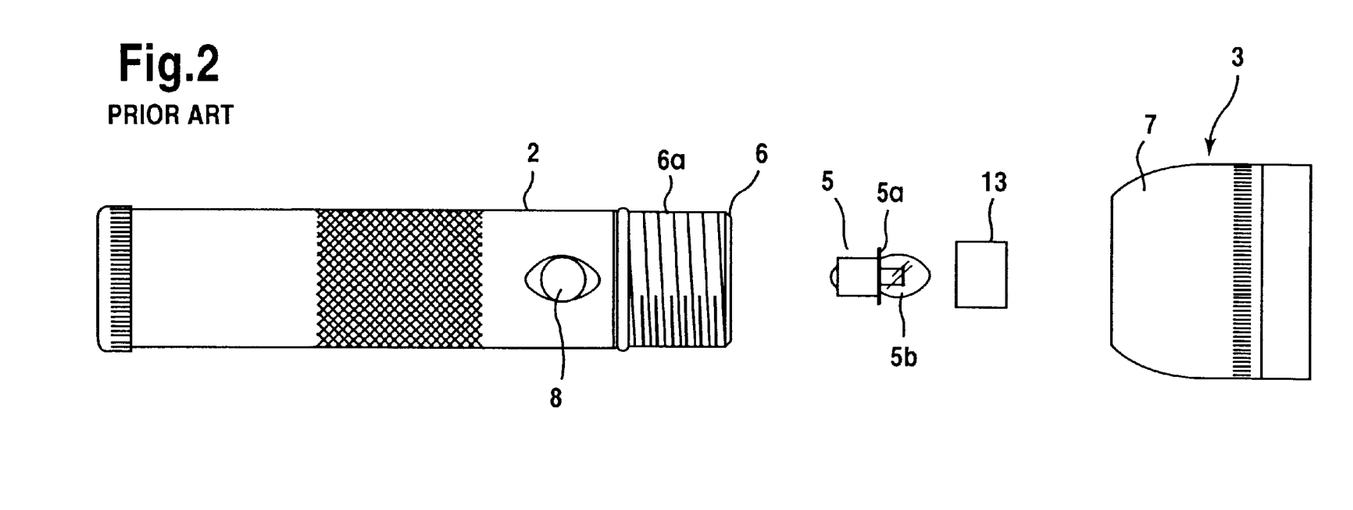
FIG. 2 is a side view of the flashlight of FIG. 1 in its exploded state.

As shown in FIG. 1 and FIG. 2 by way of example, the conventional flashlight 1 applicable to a bicycle typically comprises a battery case 2 in which two batteries 4 are placed in series, and a light emitting unit 3 having a light bulb 5 and a concave reflector 11 surrounding the light bulb 5. The light emitting unit 3 is detachably united with the battery case 2. That is, the light emitting unit 3 is screwed on a screw portion 6a of the battery case 2 and can be removed when replacing the batteries as shown in FIG. 2.

In case of using the aforesaid flashlight 1 as a bicycle light, the flashlight 1 having the light emitting unit 3 integrally united with the battery case 2 as shown in FIG. 2 is fixed on the handlebar of the bicycle.

The flashlight 1 is generally provided with a switch 8 to switch on or off the light. The battery case 2 holds a spring 10 within to push the batteries 4 toward the light bulb 5. Within a housing 7 of the light emitting unit 3, there are disposed a lens 12 and a cylindrical positioning member 13 surrounding the light bulb 5 in addition to the aforesaid concave reflector 11. The light bulb 5 is retained by the positioning member 13 so as to place the bulb glass 5b of the light bulb 5 in position within the reflector 11.

However, the battery case and light emitting unit, which are connected to each other in line, make the flashlight long. Consequently, when such a long flashlight is attached to a handlebar of a bicycle in a usual manner, there is a fear that the long flashlight inconveniently becomes a hindrance to a bicycle rider in handling the bicycle and apt to catch the bicycle rider and experience a shock, and it may possibly be damaged or broken. Furthermore, the conventional flashlight entails problem such as difficulty in mounting on the bicycle.

OBJECT OF THE INVENTION

An object of this invention is to provide a convenient lighting apparatus used for a bicycle, capable of being easily attached to a bicycle and safely used without being obstructive to handling of the bicycle.

Another object of this invention is to provide a handy bicycle lighting apparatus having a light emitting unit separable from a battery case so as to easily mount the light emitting unit on the handlebar of a bicycle independent of the battery case.

Still another object of this invention is to provide a safe lighting apparatus used for a bicycle, having a light emitting unit which can be made compact by being separated from a battery case so that the light emitting unit mounted on the handlebar of the bicycle is not a hindrance to a bicycle rider in handling the bicycle, and consequently, it is hard to experience a shock and be damaged in riding the bicycle.

Yet another object of this invention is to provide a convenient light apparatus capable of being easily demounted from a bicycle and used separate from the bicycle as a portable flashlight or the like.

SUMMARY OF THE INVENTION

To attain the object described above according to this invention, there is provided a lighting apparatus used for a bicycle, comprising a battery case for accommodating one or more batteries, a connection adapter detachably attached to the battery case, a light emitting unit with a light bulb, which is separable from the battery case, a fixing supporter detachably attached to the light emitting unit to be fitted to the connection adapter, and a power supply cable for electrically connecting the batteries in the battery case with the light bulb in the light emitting unit The battery case may be provided with a switch for allowing the light bulb to be selectively connected with or disconnected from the batteries in the battery case to switch on or off the light bulb.

The light emitting unit separable from the battery case can be solely mounted on any position of a bicycle, which is different from that to which the battery case is mounted, and supplied with an electric current through the power supply cable. That is, there may be attached the light emitting unit to a handlebar of a bicycle by use of a retaining member, and the battery case to a down tube of the bicycle by use of mounting means.

By demounting the light emitting unit and the battery case from the bicycle and removing the connection adapter and the fixing supporter from the light emitting unit and the battery case, the lighting apparatus can be used separate from the bicycle as a handy flashlight by joining the light emitting unit directly to the battery case.

Other and fixer objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

One embodiment of a lighting apparatus for a bicycle according to this invention, which is convenient to mount on a bicycle and easy to handle, will be described hereinafter with reference to the accompanying drawings.

Figure 3:
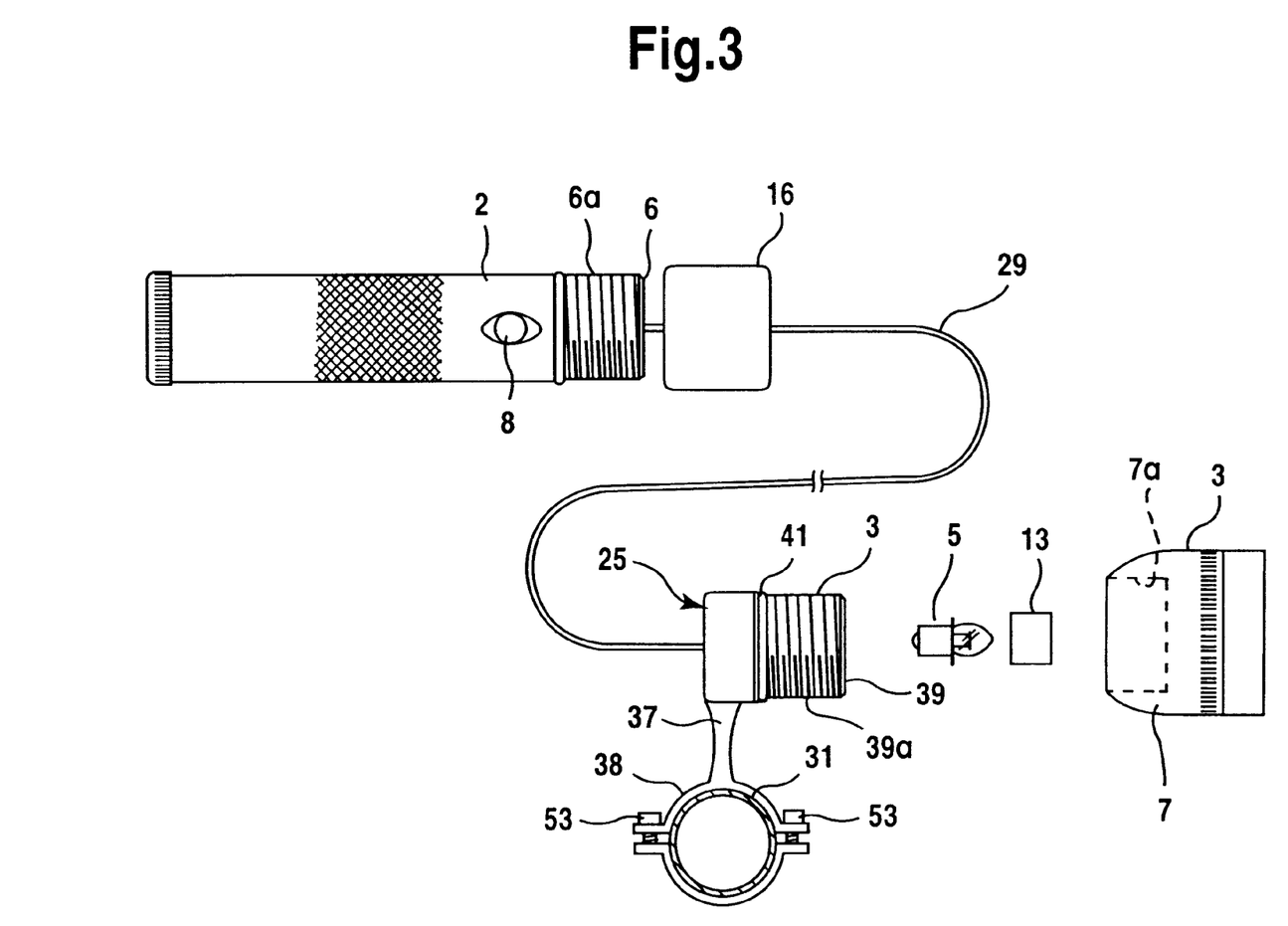
FIG. 3 is side view showing one embodiment of a lighting apparatus for a bicycle according to this invention.

The lighting apparatus of the invention primarily comprises a battery case 2 for accommodating two batteries, a connection adapter 16 detachably attached to the battery case 2, a light emitting unit 3 incorporating a light bulb 5, a fixing supporter 25 detachably attached to the light emitting unit 3, and a power supply cable 29 for electrically connecting the battery case 2 with the light emitting unit 3 through the connection adapter 16 and the fixing supporter 25.

The battery case 2 and the light emitting unit 3 are separated from each other in a usual state by using the connection adapter 16 and the fixing supporter 25, but they are attachable to each other upon removing the connection adapter 16 and the fixing supporter 25.

The battery case 2 in this embodiment is provided with a switch 8 for allowing the light bulb 5 to be selectively connected with or disconnected from the batteries in the battery case 2.

Figure 10:
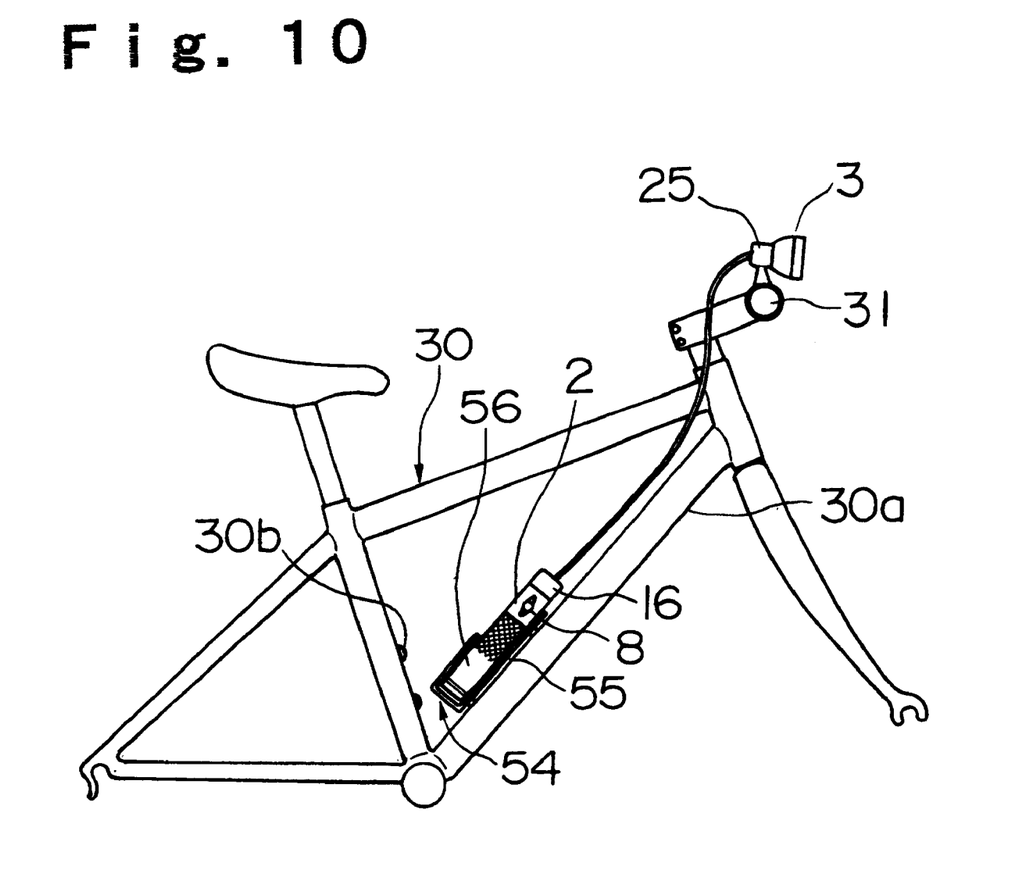
FIG. 10 is a side view explanatory of the state in which the apparatus of FIG. 3 is used.

As illustrated in FIG. 10 by way of example, the battery case 2 with the connection adapter 16 is fixed onto the down tube 30a of a bicycle by use of mounting means 54, and the light emitting unit 3 supported by the fixing supporter 25 is attached to a handlebar 31 of the bicycle by use of a retaining member.

Figure 4:
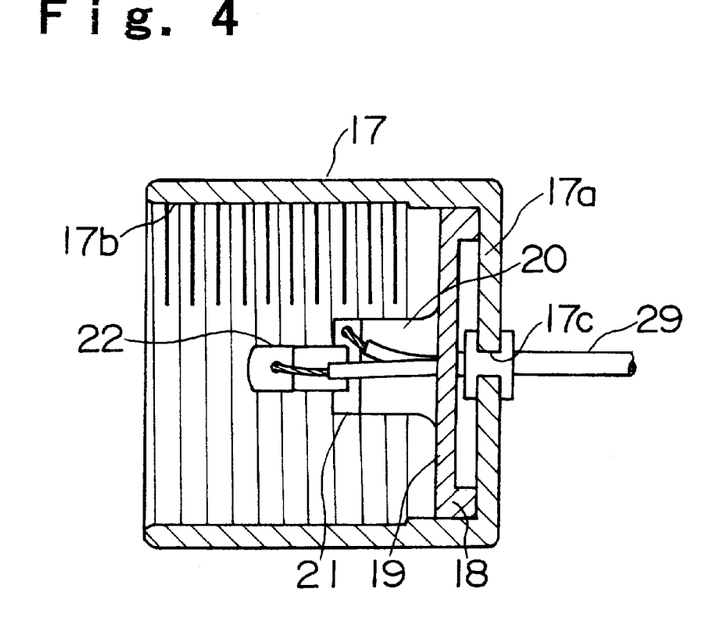
FIG. 4 is a sectional side view showing a connection adapter used in the apparatus of FIG. 3.

The connection adapter 16 in this embodiment is made of aluminum, and as shown in FIG. 4, it is formed of a cylindrical lid cap 17 with an end wall 17a and an intervention member 18 fitted into the lid cap 17, two metallic conductive plates 21 and 22 formed in a substantial U shape, which are fixed onto a protrusion 20 projecting out from a circular base 19 of the intervention member 18. The circular base 19 is fitted inside the lid cap 17.

The end wall 17a of the lid cap 17 has a through hole 17c, and the base 19 of the intervention member 18 has a through hole 19a. The power supply cable 29 passes through the through holes 17c and 19a. Thus, the adapter 16 can be joined to the battery case 2 by screwing a female screw portion 17b inside the cylindrical lid cap 17 on a male screw portion 6a formed on an end part 6 of the battery case 2.

Figure 5:
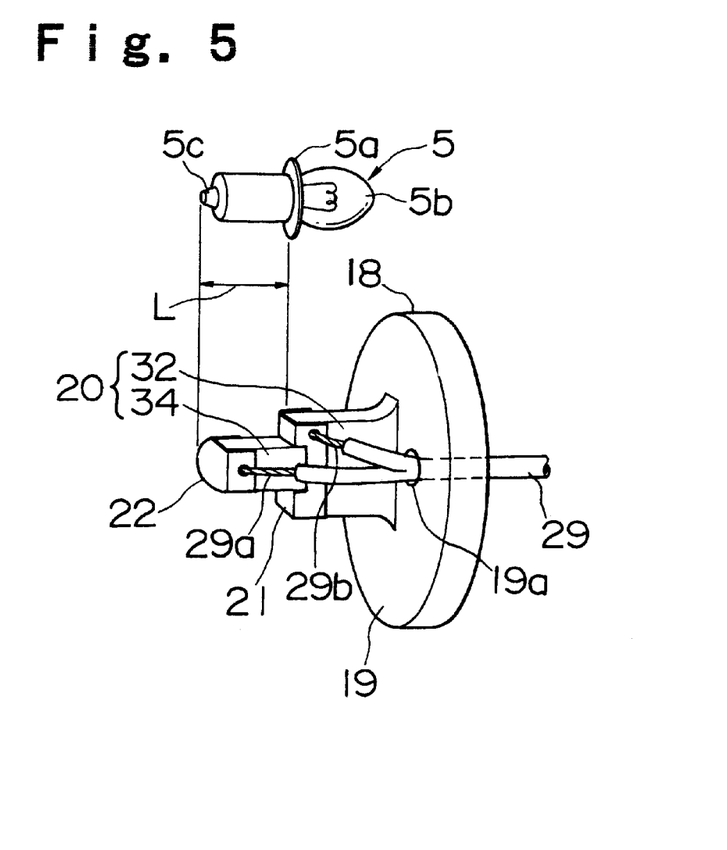
FIG. 5 is a perspective view showing component elements incorporated in the adapter of FIG. 4.
Figure 6:
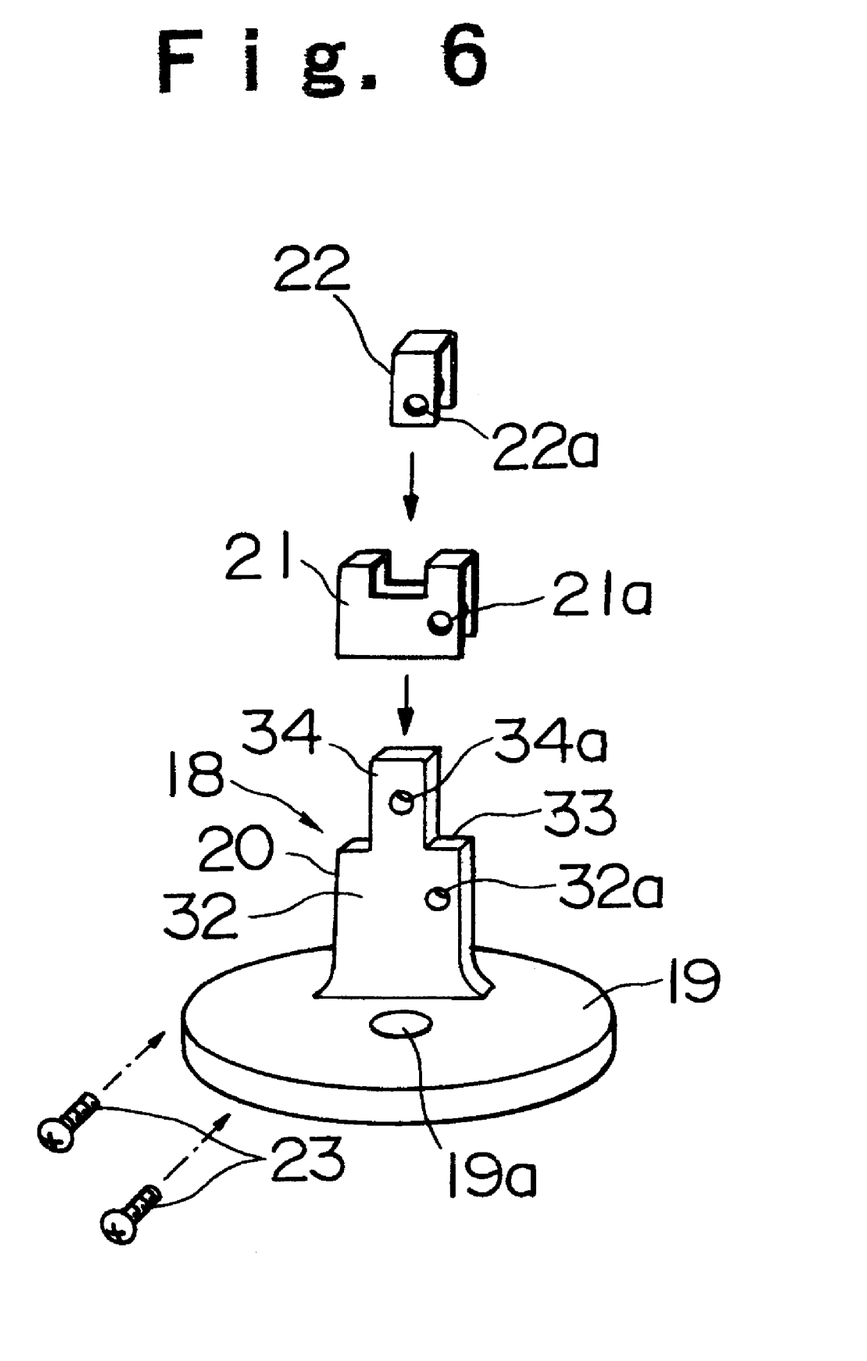
FIG. 6 is an exploded view of FIG. 5.

The protrusion 20 formed on the intervention member 18 is made of electric insulating synthetic resin, and as shown in FIG. 5 and FIG. 6, it has a wide part 32 connected to the circular base 19, and a narrow part 34 projecting out from a stage surface 33 of the wide part 32. As shown in FIG. 5, the length L of the narrow part 34 of the protrusion 20, which extends from the stage surface 33 to the free end of the narrow part 34, is substantially equal to the length of the screw base of the light bulb 5, which is defined from a flange 5a to an end terminal 5c of the bulb Thus, when the cylindrical lid cap 17 is fitted on the end part 6 of the battery case 2 in which the batteries are accommodated, the conductive plate 22 comes into electric contact with one of the batteries in the battery case 2, and the conductive plate 21 is kept in electric contact with the inside of the cylindrical lid cap 17.

The conductive plates 21 and 22 have fitting holes 21a and 22a being in registration with holes 32a and 34a bored in the wide part 32 and narrow part 34 of the protrusion 20, as shown in FIG. 6. Through the matching holes 21a=a and 22a–34a, set-screws 23 are tightened to fix the conductive plates 21 and 22 onto the protrusion 20 in the electrically insulated state.

Figure 7:
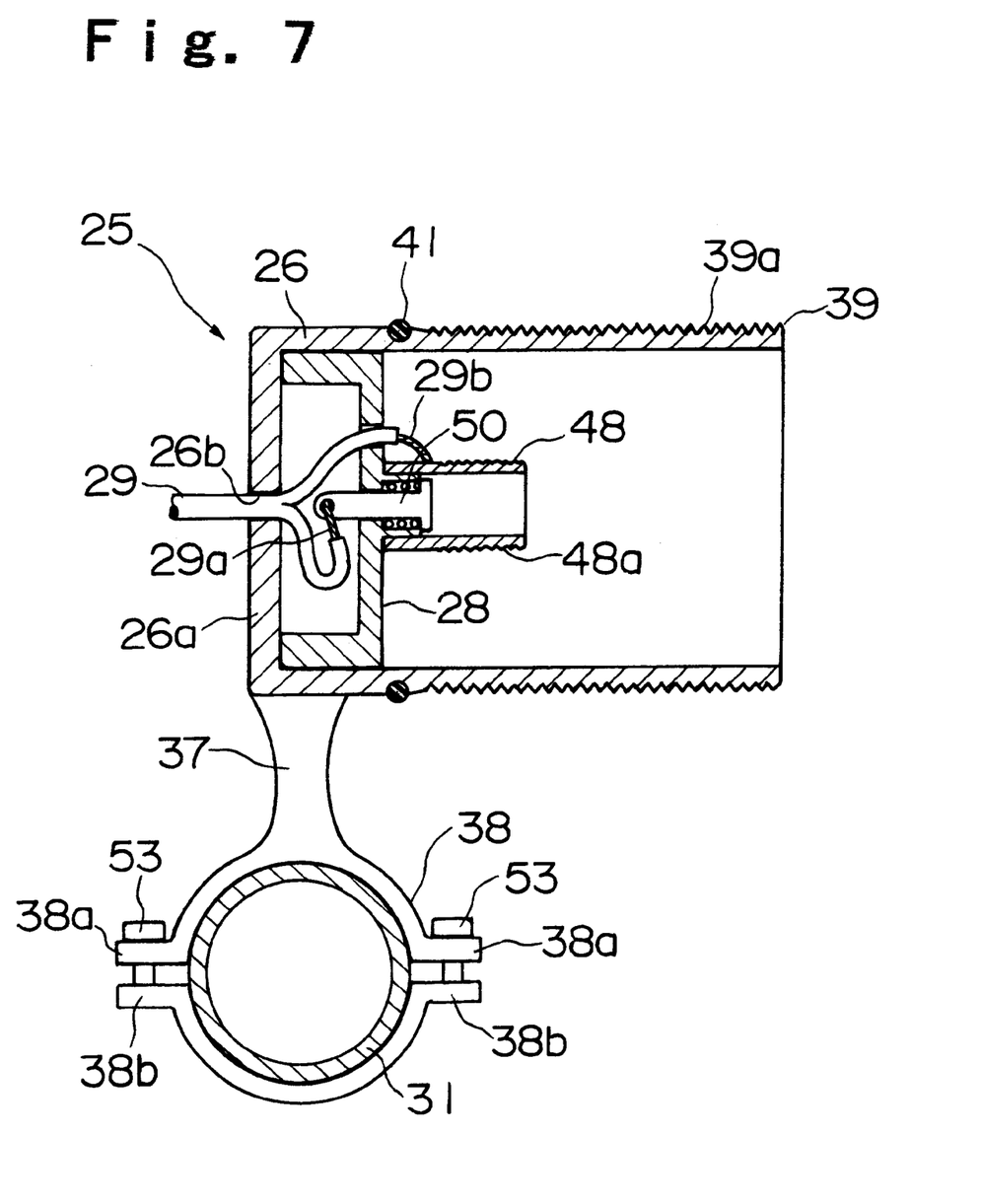
FIG. 7 is a sectional side view of a fixing supporter used in the apparatus of FIG. 3.

The fixing supporter 25 is made of aluminum, and as shown in FIG. 7, it is formed of a cylindrical housing 26 with an end wall 26a, and a leg portion 37. The leg portion 37 is provided at its lower end with a split mounting ring 38 for fixing the light emitting unit 3 onto the handlebar 31 or other portion of the bicycle. An intervention member 28 for securing the power supply cable 29 is fitted in the housing 26. The socket portion 39 is provided in its outer peripheral surface with a male screw thread 39a.

At the rear end portion of the male screw thread 39a, there is placed a waterproof sealing ring 41 of rubber or the like. The waterproof sealing ring 41 prevents entry of moisture or water into the inside of the light emitting unit 3.

A light cover 7 of the light emitting unit 3 has a female screw thread 7a so as to be screwed on the fixing supporter 25. Thus, the light cover 7 can be attached to and detached from the fixing supporter 25 by screwing or unscrewing it.

Figure 8:
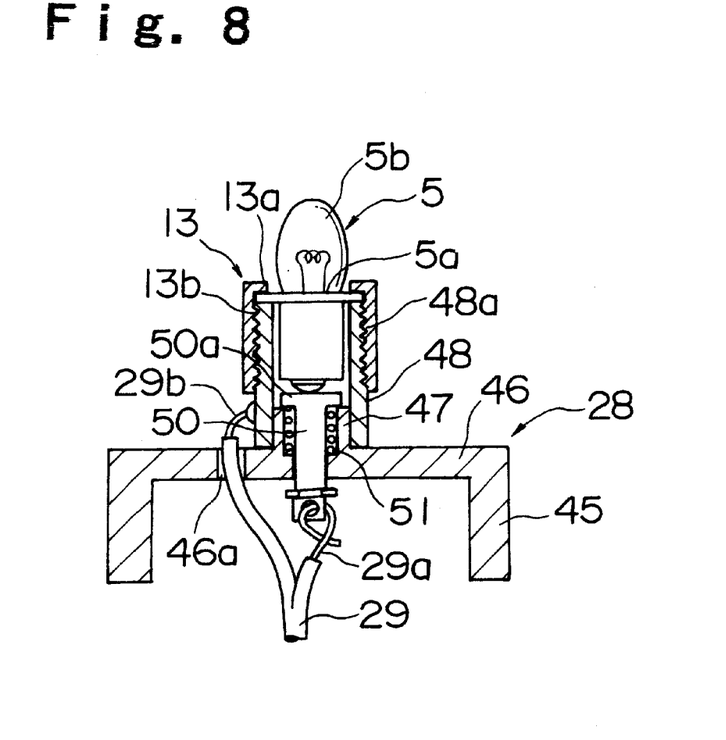
FIG. 8 is a sectional side view of the fixing supporter of FIG. 7 with a retaining member for the fixing supporter.

The intervention member 28 in the fixing supporter 25 is made of electric insulating synthetic resin, and as shown in FIG. 7 and FIG. 8, it is formed of a short cylindrical part 45, a basal plate 46 connected to the short cylindrical part 45, and a columnar projection 47 projecting in the axial direction of the intervention member. The projection 47 is fitted in a cylinder member 48. A metallic terminal pin member 50 having a terminal head 50a pierces through the columnar projection 47 and basal plate 46 of the intervention member 28 in such a state that the terminal head 50a collides with the front end of the projection 47.

The power supply cable 29 has two wires 29a and 29b and passes through a through hole 26b formed in the end wall 26a of the housing 26. One of the wires, 29a, is connected to the terminal pin member 50 within the short cylindrical part 45 of the intervention member 28, and the other wire 29b passes through a through hole 46a formed in the basal plate 46 of the intervention member 28 and connected to the outer surface of the cylinder member 48.

A male screw thread 48a is formed in the outer peripheral surface of the cylinder member 48. The terminal pin member 50 is so designed that the terminal head 50a is out of contact with the inner surface of the cylinder member 48. The terminal pin member 50 is pushed forward by a compression spring 51 placed around the pin member 50 within a neck portion between the terminal head 50a and the basal plate 46 of the intervention member 28.

As shown in FIG. 8 illustrating the fixing supporter 25, the light bulb 5 is inserted in the cylinder member 48 until the flange 5a of the light bulb 5 collides with the front end of the cylinder member 48 so as to bring the end terminal contact of the light bulb 5 into contact with the terminal head 50a of the terminal pin member 50, and then, the positioning member 13 having a male screw thread 13b is screwed on the cylinder member 48 having the female screw thread 48a. Thus, the light bulb 5 is secured in place by means of the positioning member 13.

Figure 9:
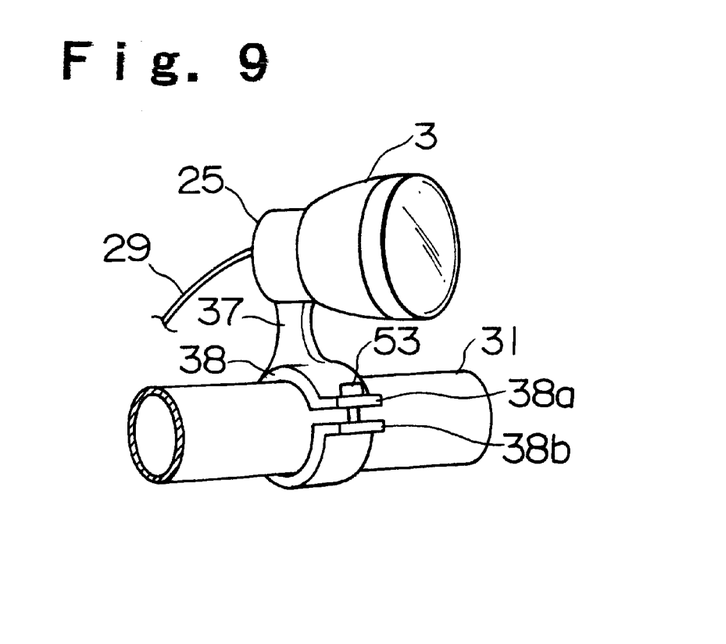
FIG. 9 is a perspective view showing the light emitting unit of FIG. 3 in the state mounted on a handlebar of the bicycle.

The fixing supporter 25 is fixed on the handlebar 31 of the bicycle by putting the handlebar 31 between the counterparts of the split mounting ring 38 and squeezing flanges 38a and 38b of the counterparts of the split mounting ring 38 by using screws 53, as shown in FIG. 7 and FIG. 9. Thus, the light emitting unit 3 can easily be mounted on the bicycle owing to the retaining member using the split mounting ring 38.

As illustrated in FIG. 10 showing the state of applying the lighting apparatus to a bicycle, the battery case 2 with the connection adapter 16 is mounted on a down tube 30a of a bicycle frame 30 by use of the mounting means 54, and the fixing supporter 25 with the light emitting unit 3 is mounted on the handlebar 31 of the bicycle by use of the retaining member in the manner as described above.

The mounting means 54 comprises mounting members 55 and 56 of elastic material, which are integrally united to each other. The mounting member 55 is formed in a substantially U shape. Also, the mounting member 56 has a semi-circular section. The battery case 2 is secured in position on the frame of the bicycle in such a manner that the mounting members 55 and 56 are first fixed on a mounting seat disposed on the down tube 30a by use of bolts (not shown), and then, the battery case 2 is put between the mounting members 55 and 56 through a cushion sheet or the like.

As is obvious from the foregoing description, the bicycle lighting apparatus according to this invention has the following outstanding advantages.

The bicycle lighting apparatus 1 of this invention having the battery case 2 and the light emitting unit 3 separable from the battery case 2 makes it possible to fix only the light emitting unit 3 on the handlebar of the bicycle independent of the battery case. Accordingly, the light emitting unit 3 can be easily mounted on the handlebar of the bicycle and used in safety, and the battery case 2 may be mounted on any other position of the bicycle where it is not a hindrance to a bicycle rider in handling the bicycle.

Furthermore, the lighting apparatus of the invention can easily be used separate from the bicycle as a flashlight by demounting the light emitting unit 3 from the handlebar of the bicycle and the battery case 2 from the mounting means 54 set on the frame of the bicycle. That is, the lighting apparatus can be used as the portable flashlight by removing the connection adapter 16 from the battery case 2 and the fixing supporter 25 from the light emitting unit 3 and screwing the light emitting unit 3 directly on the battery case 2.

The light emitting unit coupled with the fixing supporter 25 is water-tightly sealed by the sealing ring 41 placed around the housing 26 of the fixing supporter 25. Accordingly, even when the lighting apparatus of the invention is used in the rain, the lighting apparatus never gets out of order due to rainwater.

Furthermore, since the retaining member for mounting the light emitting unit 3 on the handlebar of the bicycle is adopted of the split mounting ring 38, it is very easy to fix the light emitting unit 3 to the bicycle by screwing up the screws 53 and adjust a light emitting angle of the light emitted from the light bulb 5 in the light emitting unit 3 by handling the screws 53.

Since the principal parts of the lighting apparatus of the invention, e.g. connection adapter 16, fixing supporter 25, and housing 26, are made of light-weight material such as aluminum, the apparatus is not only excellent in durability and pleasant to the touch, but also can be made light in weight. It is needless to say that these components are not always made of aluminum, but may be made of any other light-weight and tough materials.

The lighting apparatus of this invention is by no means limited only to the aforementioned embodiment and may of course be modified or changed in various ways without departing from the spirit and scope of the invention. For example, a straight electric cord is used as the power supply cable 29 in the illustrated embodiment, but a spiral electric cord may be used instead so as to prevent sag of the cable running along the frame of the bicycle. The power supply cable 29 may branch off on the route to use a plurality of light bulbs. The battery case 2 is not always fixed on the down tube of the frame of the bicycle and may of course be mounted anywhere of the bicycle. The location of the switch 8, which is placed on the battery case 2 in the illustrated embodiment, may be changed to the light emitting unit 3 or fixing supporter 25, so that the light bulb is switched on or off near at hand while riding on the bicycle.

As is described above, since the bicycle lighting apparatus of the invention comprises the battery case for accommodating one or more batteries, the connection adapter attached to the battery case, the light emitting unit separable from the battery case, the fixing supporter attached to the light emitting unit, and the power supply cable for connecting the battery case with the light emitting unit, the lighting apparatus can easily be mounted on the bicycle independent of the battery case and safely used without being obstructive to handling of the bicycle. Furthermore, according to the invention, the light emitting unit can be made compact, so that the light emitting unit mounted on the handlebar of the bicycle is not a hindrance to a bicycle rider in handling the bicycle, and consequently, it is hard to experience a shock and be damaged in riding the bicycle. Besides, since the light apparatus of the invention can easily be demounted from the bicycle and used separate from the bicycle as a portable flashlight or the like, it is very convenient and easy to carry and handle.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A lighting apparatus used for a bicycle, comprising:
   a battery case for accommodating one or more batteries;
   a connection adapter detachably attached to and separable from said battery case;
   a light emitting unit with a light bulb, the light emitting unit having a fixing supporter with a leg portion, the fixing supporter detachably attached to and separable from said light emitting unit;

mounting means for fixing said battery case to a down tube of the bicycle;

a retaining member comprising a split mounting ring with flanges on a lower end of the leg portion of the fixing supporter arranged to be fixed on a handlebar of the bicycle; and a power supply cable for electrically connecting said one or more batteries with said light emitting unit, said battery case, separated from said connection adapter, and said light emitting unit, separated from said fixing supporter, being formed into a flashlight in their united state.

2. A lighting apparatus used for a bicycle, comprising:

a battery case for accommodating one or more batteries;

a connection adapter detachably attached to and separable from said battery case;

a light emitting unit with a light bulb, said battery case provided with a switch for selectively switching on and off said light bulb;

a fixing supporter detachable attached to and separable from said light emitting unit;

mounting means for fixing said battery case to a down tube of the bicycle;

a retaining member comprising a split mounting ring with flanges on a lower end of a leg portion of the fixing supporter arranged to be fixed on a handlebar of the bicycle; and a power supply cable for electrically connecting said one or more batteries with said light emitting unit, said battery case, separated from said connection adapter, and said light emitting unit, separated from said fixing supporter, being formed into a flashlight in their united state.

* * * * *